United States Patent [19]

Tarallo et al.

[11] Patent Number: 5,054,035

[45] Date of Patent: Oct. 1, 1991

[54] DIGITAL SIGNAL QUALITY EVALUATION CIRCUIT USING SYNCHRONIZATION PATTERNS

[75] Inventors: Joseph A. Tarallo, Bedminster; George I. Zysman, Mendham, both of N.J.

[73] Assignee: AT&T Bell Laboratories, Murray Hill, N.J.

[21] Appl. No.: 454,487

[22] Filed: Dec. 21, 1989

[51] Int. Cl.⁵ ............................................. H04B 3/46
[52] U.S. Cl. ........................................ 375/10; 375/114; 375/116
[58] Field of Search ................. 375/10, 106, 114, 116; 370/106, 105.1, 105.4; 371/42, 46; 340/825.2; 380/48, 50; 358/17, 319; 307/269; 328/63, 72

[56] References Cited

U.S. PATENT DOCUMENTS

| | | | |
|---|---|---|---|
| 3,699,261 | 10/1972 | Tomozawa | 375/116 |
| 4,596,981 | 6/1986 | Ueno et al. | 375/116 |
| 4,694,473 | 9/1987 | Etoh | 370/106 |
| 4,807,248 | 2/1989 | Pyatt et al. | 375/114 |
| 4,807,261 | 2/1989 | Johnson | 375/114 |
| 4,899,383 | 2/1990 | Einolf, Jr. et al. | 375/116 |

Primary Examiner—Stephen Chin
Attorney, Agent, or Firm—A. G. Steinmetz

[57] ABSTRACT

In evaluating the quality of received digital signals in terminals of a mobile communication system, the bit error rate is measured. Each station receives signals in successive data frames which includes a synchronization pattern and stores a version of the synchronization pattern. The received synchronization pattern is compared to the stored synchronization pattern to derive a signal representative of the received signal quality. The quality signal may then be used for hand-off to other base stations or other call transfers. Since the synchronization pattern is included in each data frame, measuring signal quality therefrom obviates the need for system generation and interpretation of special quality messages.

4 Claims, 5 Drawing Sheets

DIGITAL SIGNAL QUALITY EVALUATION CIRCUIT USING SYNCHRONIZATION PATTERNS

FIELD OF THE INVENTION

The invention relates to communication systems and, more particularly, to arrangements for monitoring mobile radio communication channels.

BACKGROUND OF THE INVENTION

In mobile radio systems such as cellular telephone, a large number of subscribers can be accommodated within a given frequency band by dividing a geographical area into smaller zones or cells and limiting the range of transmission to cell boundaries. The divided area arrangement permits reuse of channels within the system and greater utilization of the RF spectrum. A base station in each cell communicates with mobile units therein. All base stations are connected to a common control that determines call connections for the communication system. In this way, the same communication channels may be used concurrently in different cells.

When the quality of a connection between a base station and a mobile station is poor, the connection should be transferred to another channel within the cell or to another cell. In order to determine when such a transfer is required, the quality of signals received by the base station and the mobile unit must be monitored. If the monitored quality does not meet a predetermined standard, the common control is alerted and the connection is switched to another channel or handed off to another cell.

In analog communication channels, there are many ways to determine signal quality. These include measuring the relative strength of the signals received by a station and measuring the signal to noise ratio at the station receiver. U.S. Pat. No. 4,308,429 issued to Kai et al, Dec. 29, 1981, discloses a mobile telephone channel exchange system in which base station receivers detect carrier signal drop-off or carrier level which detected carrier levels are used to control channel transfers.

Where the channel carries digital signals, direct measurement of signal strength or signal to noise ratio may not be accurate due to the possible presence of interfering signals. Better alternatives for digital communication channels have been based on evaluation of the transmission error rate. In contrast to the direct measurements of signal used in analog channels, error rate evaluation generally requires some knowledge of the information being carried by the transmission channel. U.S. Pat. No. 4,829,519 issued to Scotton et al, May 9, 1989, for example, discloses an automatic cell transfer system with error rate assessment in which special messages are transmitted from a base station to a mobile receiver. The mobile receiver is equipped to monitor the bit or symbol error rate resulting from transmission of the special message by comparing the special message bits to a bit pattern stored in the mobile unit. Transfers between different base stations are made when prescribed error rate thresholds are crossed.

While special message error rate detection provides a satisfactory means for evaluating the quality of digital signals in a mobile communication channel, it requires periodic interruptions of information transmission over the channel. Consequently, the efficiency of data transmission and channel usage may be significantly reduced.

It is an object of the invention to provide improved digital signal quality monitoring without reducing channel usage efficiency.

BRIEF SUMMARY OF THE INVENTION

The foregoing object is achieved by utilizing the synchronization pattern inherent in multiplexed digital transmission channels. Digital signal quality is evaluated by determining the degree of correctness in the successively received synchronizing patterns required in the time frames of digital signals. The use of the frame synchronization patterns obviates the need for system generation and interpretation of special quality messages.

The invention is directed to a mobile radio communication system in which information signals are transmitted over a channel in time frame sequences. Each time frame includes a set of information symbols and a prescribed set of synchronization symbols. A receiver stores a signal corresponding to the prescribed set of synchronization symbols. The prescribed synchronization symbol set received from the channel is compared to the stored prescribed synchronization signal to produce a signal representing the differences between the stored synchronization symbol signal and the received synchronization symbol set. A signal representative of the quality of the received information signals is formed from the sequence of synchronization differences signals.

DETAILED DESCRIPTION

Figure 1:
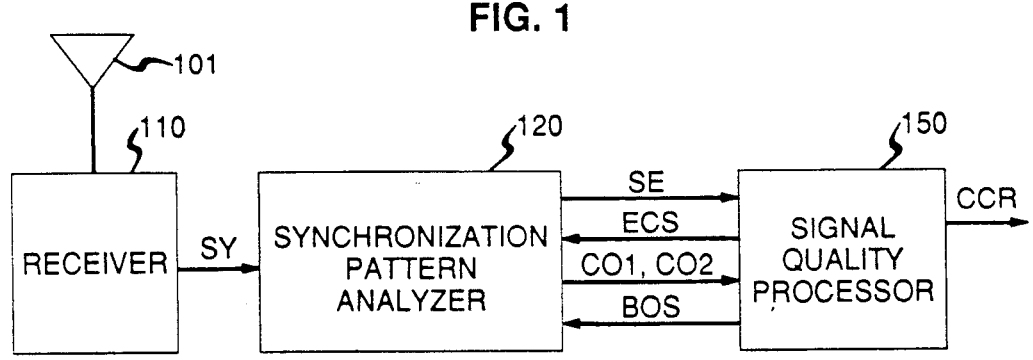
FIG. 1 is a general block diagram of a radio terminal arrangement illustrative of the invention that includes a synchronization pattern analyzer and signal quality processor.

A radio arrangement which may be a mobile radio terminal that is illustrative of the invention is shown in FIG. 1. Referring to FIG. 1, the terminal arrangement comprises antenna 101, receiver 110, synchronization pattern analyzer 120 and signal quality processor 150. Antenna 101 receives digital signal modulated waves from a radio channel that may be part of a cellular communication system. Receiver 110 which may reside in a cell site terminal or a mobile terminal extracts the digital signals from the modulated waves and forms an information symbol sequence SY corresponding to the information sent to the radio channel.

The information symbol or bit sequence for a particular subscriber is generally partitioned into successive frames. Each frame includes a prescribed number of information symbols and a prescribed pattern of symbols that provides frame synchronization. Where each frame comprises a bit sequence, the synchronization pattern may be a binary pattern such as 1111100101000. If quarternary differential phase shift keying is used, the synchronizing symbol pattern may be 0, $\pi/4$, $\pi/2$, $-3\pi/4$, 0, $-3\pi/4$, $\pi/2$, $\pi/4$, 0, $\pi/4$, $\pi/2$, $-3\pi/4$. The synchronization pattern is applied to synchronization pattern analyzer 120 which identifies the beginning of each frame and classifies the information in different parts of the frame. In accordance with the invention, analyzer 120 is adapted to determine the symbol or bit error rate SE on the basis of the synchronization pattern, and signal quality processor 150 is adapted to determine whether the bit error rate is excessive. Advantageously, bit error rate and signal quality measurements are performed continuously without any interruption of normal information flow by special signal quality evaluation messages.

Figure 2:
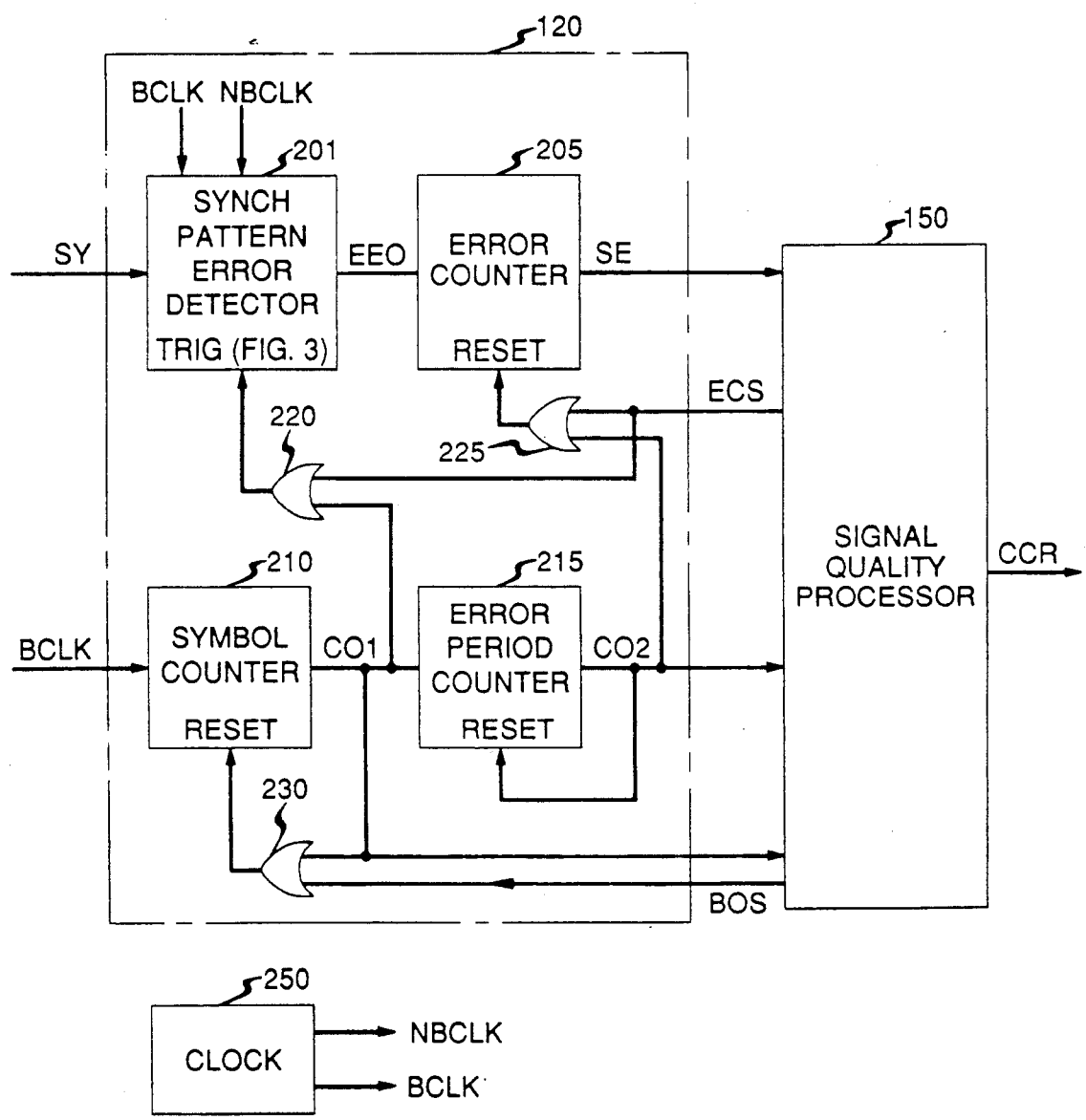
FIG. 2 is a more detailed block diagram of the synchronization pattern analyzer and the signal quality processor of FIG. 1.
Figure 4:
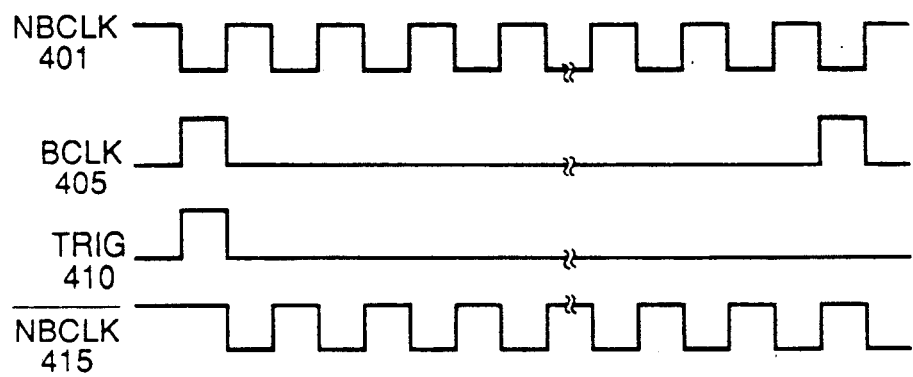
FIG. 4 shows waveforms useful in illustrating the operation of the circuit of FIG. 3.

A more detailed block diagram of one particular embodiment of the synchronization analyzer 120 and the signal quality processor 150 is shown in FIG. 2. The embodiment of FIG. 2 includes synchronization pattern error detector 201, error counter 205, symbol counter 210, error period counter 215, or gates 220, 225 and 230, signal quality processor 150 and clock 250.

Figure 5:
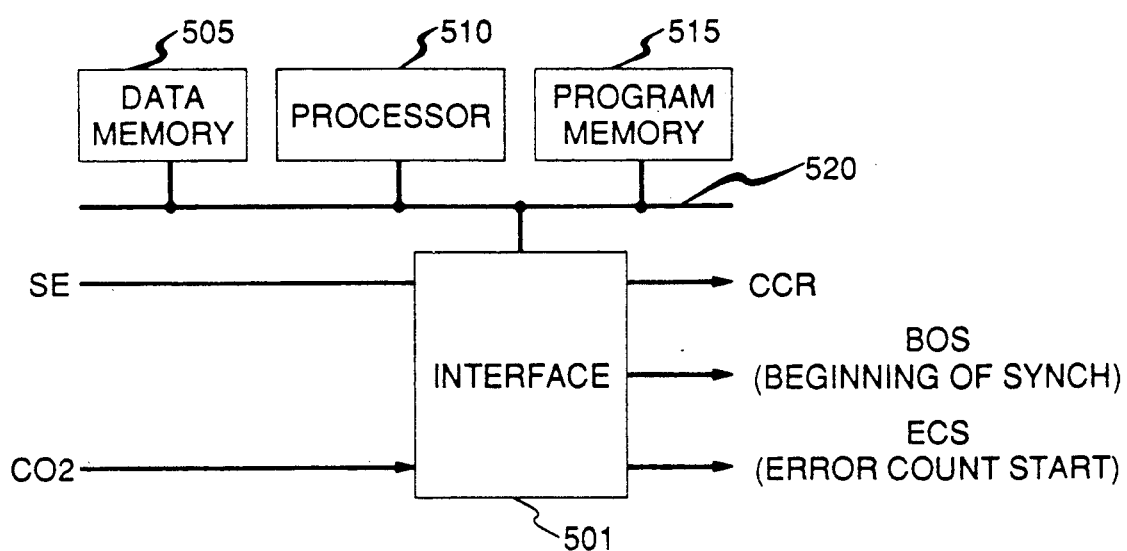
FIG. 5 is a block diagram of a signal processor that may be used as the signal quality processor of FIGS. 1 and 2.
Figure 6:
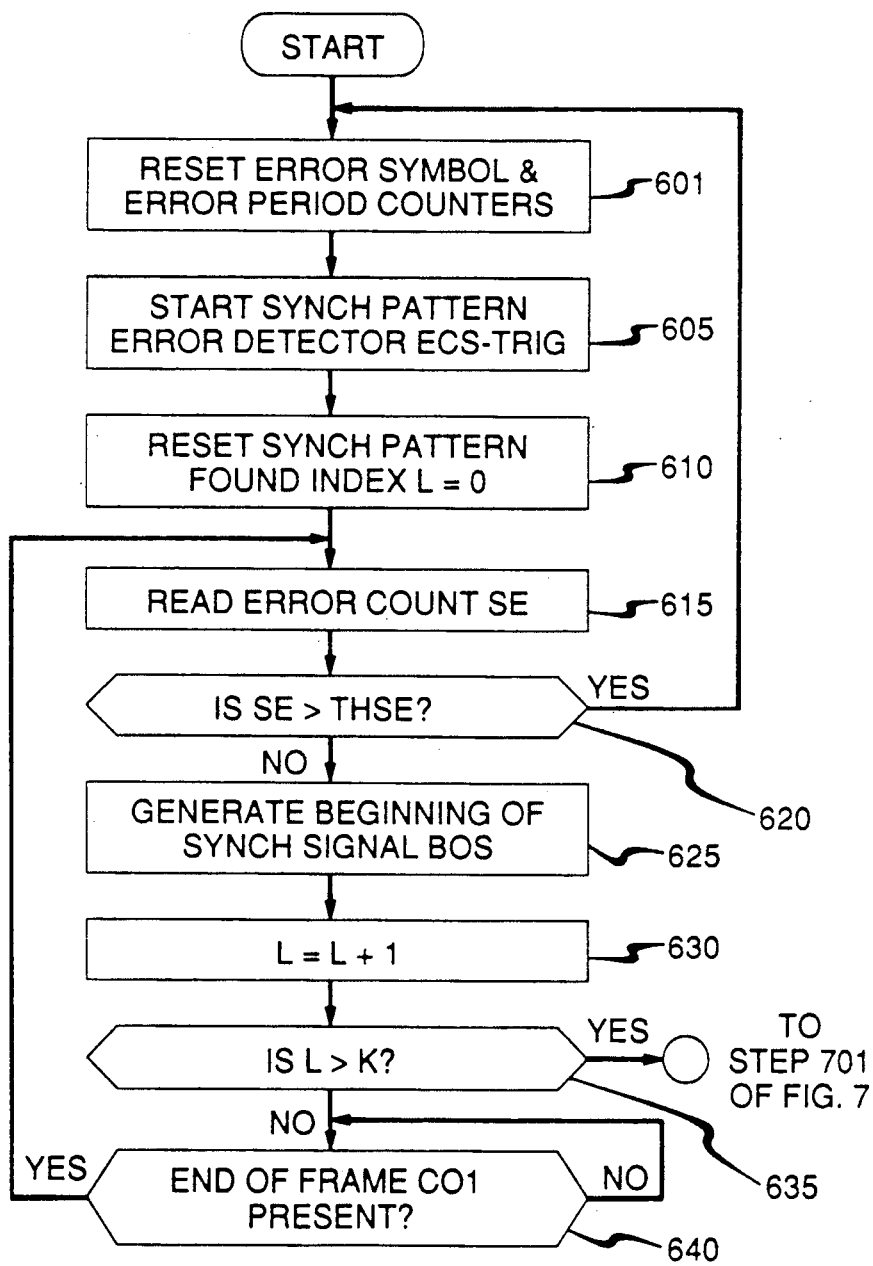
FIGS. 6 and 7 are flowcharts illustrating the operation of the circuit of FIG. 2.
Figure 7:
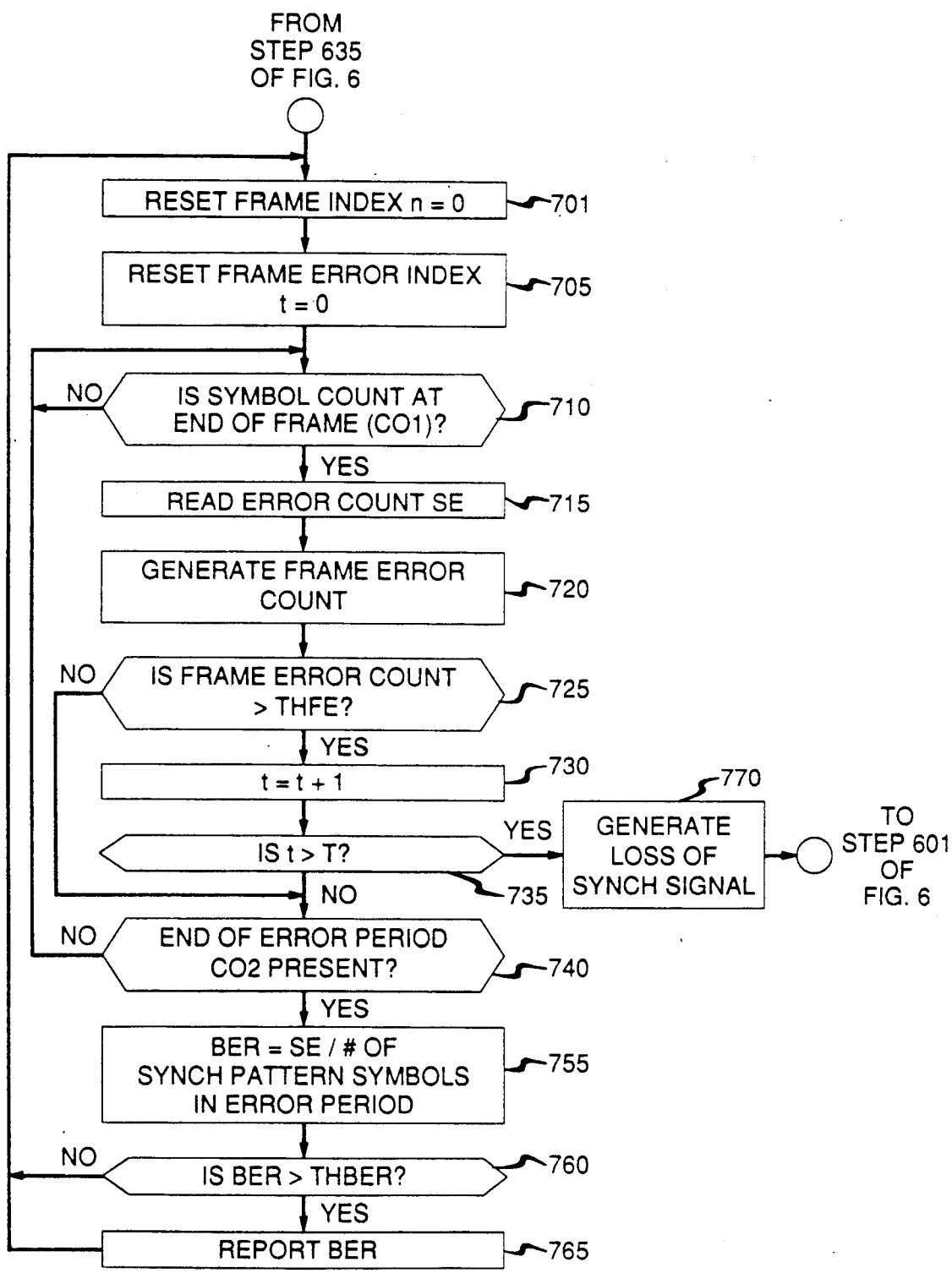

FIG. 5 shows a more detailed block diagram of signal quality processor 150. Processor 150 may comprise a microprocessor such as the Intel type 8051 microcontroller which includes an input-output interface 501, data memory 505, processor 510, program memory 515 and bus 520. Interface 501 receives error signals SE from error counter 205, counter end pulses CO1 and CO2 from symbol counter 210 and error period counter 215. It also sends error count start pulse ECS and beginning of synchronization pulse BOS to analyzer 120 in accordance with instructions permanently stored in program memory 515 via processor 510. The SE error signals from error counter 205 are transferred to data memory 505 and are used to generate a quality evaluation signal in processor 510. A signal quality report signal CCR is generated in processor 510 if the signal quality is below a specific threshold. Signal CCR is then output through interface 501. The operations of processor 150 are determined by instructions permanently stored in program memory 515. Flowcharts illustrating these instructions are shown in FIGS. 6 and 7.

Error detection is performed by comparing the symbol sequence from receiver 110 with the prestored symbol pattern. A block diagram of an embodiment of synchronization pattern error detector 201 of FIG. 2 is shown in greater detail in FIG. 3. The circuit of FIG. 3 comprises N stage shift registers 301, 305 and 310, flip flop 320, inverter 335, gates 325 and 340 and exclusive-or gate 330. Received symbols SY are sequentially applied to shift register 301 of the synchronization pattern error detector in FIG. 3 from receiver 110 in FIG. 1. The synchronization pattern error detector includes a prestored synchronization pattern in shift register 310. In a selected symbol period of each time frame, the symbols in shift register 301 of the synchronization pattern are transferred in parallel to shift register 305. The symbol bits in shift register 305 representative of the synchronization pattern are compared to a prestored version of the synchronization pattern bits stored in shift register 310 in exclusive-or gate 330. The error signals produced by exclusive-or gate 330 are applied as signals EEO to error counter 205 in FIG. 2.

Figure 3:
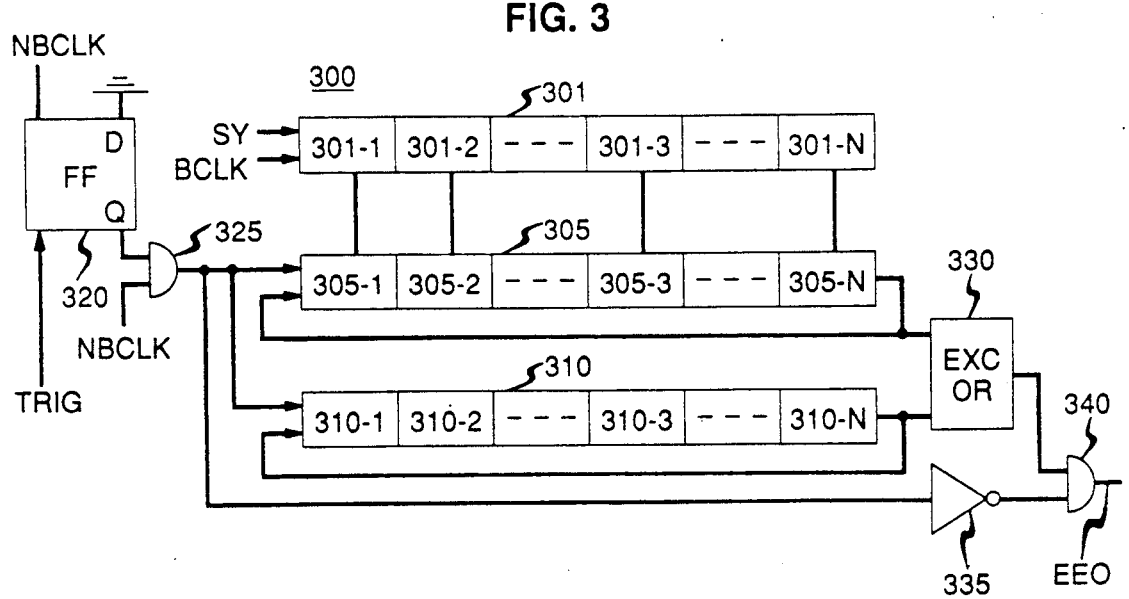
FIG. 3 is a more detailed block diagram of the synchronization pattern analyzer of FIG. 2.

Symbol bits SY are supplied to stage 301-1 of shift register 301 and serially shifted through stages 301-1, 301-3, ..., 301-n, ..., and 301-N. At the deginning of each symbol period, signal BCLK (waveform 405) transfers the received symbols in shift register 301 to shift register 305 and serially shifts shift register 301 one symbol position. The operation of the synchronization pattern error detector of FIG. 3 is initiated by signal TRIG applied to flip flop 320. Signal TRIG occurring when the received synchronization pattern is in shift register 301 presets flip flop 320 so that signal NBCLK causes shift registers 305 and 310 to recirculate once in the synchronization symbol period. Each received symbol SY stored in register 305 is thereby compared to the corresponding symbol stored in shift register 310 in exclusive-or gate 330. If the symbol sequence applied to exclusive-or gate 330 from shift register 305 matches the symbol sequence from shift register 310, no error pulses are generated. If the symbol sequences do not match, the number of error signals EEO obtained from and gate 340 indicates the degree of mismatch.

The operation of the synchronization analyzer and signal quality processor to perform synchronization and signal quality evaluation are described with reference to FIG. 2 and the flowchart of FIGS. 6 and 7. FIGS. 2 and 6 illustrate the operations of the synchronization phase, and FIGS. 2 and 7 illustrate the operations of the signal quality evaluation phase. Initially, the arrangement of FIG. 2 is used to determine the frame beginning for synchronization purposes. The sequence of symbols SY is applied to synchronization pattern error detector 201 from receiver 101 in FIG. 1.

Referring to FIG. 2 and the flowchart of FIG. 6, the synchronization operation is started by resetting synchronization pattern error detector 201 and error counter 205 (step 601) and sending error count start pulse ECS from signal processor 150 as per step 605. The ECS pulse is produced in every symbol period in the loop from step 601 to step 620. The synchronization pattern may be at the beginning of each frame or at some other portion of the frame. In any event, the synchronization pattern is always located in the same position of each frame. Synchronization pattern error detector 201 is started by signal TRIG (step 605) and a synchronization found index L is set to zero (step 610). Error signals EEO generated in synchronization pattern error detector 201 are supplied to error counter 205 and the error count signal SE is read into signal processor 150 (step 615). If the error count SE is greater than a preset threshold THSE, synchronization has not been achieved and control is returned to step 601. When SE is less than or equal to threshold THSE, a begin synchronization signal BOS is generated in processor 150 (step 625).

Signal BOS resets symbol counter 210 through or gate 230 and signal ECS from processor 150 triggers the start of error detection in synchronization pattern error detector 201 via or gate 220. Symbol counter 220 is incremented each symbol period and a frame ending pulse CO1 is produced when its count reaches the number of symbols in a frame. Pulse CO1 increments error period counter 215 which in turn generates a CO2 pulse when the number of frames set for a signal quality evaluation period has been reached.

The beginning of synchronization signal BOS results in synchronization pattern found index L being incremented to one in signal quality processor 150 (step 630). Index L is compared to a constant K, e.g., 10, in step 635. The loop from step 625 through step 640 is iterated until the synchronization pattern in the received signal has been detected in the same symbol positions of the received frame for K successive frames. When the end of a frame is determined in symbol counter 210 (step 640), the error count is sent to signal quality processor 150 from error counter 205. If the error count SE is greater than the threshold THSE in step 620, the synchronization process is restarted in step 601. Otherwise, the synchronization begin signal BOS is generated in signal quality processor 150 (625) and synchronization found index L is incremented in step 630. Step 615 is reentered responsive to the end of frame signal CO1 from symbol counter 210. After index L is found to be greater than K in signal quality processor 150 (step 635), frame synchronization is achieved and the synchronization pattern is used to evaluate signal quality as shown in FIG. 7.

The flowchart of FIG. 7 shows the steps of the signal quality evaluation process in the circuit of FIG. 2. The flowchart of FIG. 7 corresponds to the signal quality evaluation instructions stored in program memory 515 of FIG. 5. Referring to the flowchart of FIG. 7, step 701 is entered from step 635 of FIG. 6 when frame found index L exceeds K. In steps 701 and 705, a symbol frame index n and a frame error index t in signal quality processor 150 are set to zero. Step 710 is iterated until the frame ending pulse CO1 is produced by symbol counter 210 in FIG. 2. The error count SE is transferred to signal quality processor 150 (step 715) wherein it is accumulated for the frames of the error period.

Error count SE(n) for the current frame is determined in processor 150 (step 720) and compared to a frame error threshold THFE in step 725. Where the error count for the frame exceeds the threshold, frame error index t is incremented in step 730. If the frame error index t exceeds a preset value T, signal quality processor 150 generates a loss of synchronization signal LOS (step 770). Signal quality processing is then halted and control is returned to step 601 of FIG. 6 to acquire synchronization. In the event threshold THFE is not exceeded in step 725 or frame error index t does not exceed T in step 735, step 740 is entered to check if error period counter 215 has produced an end of error period signal CO2. Until signal CO2 is received by signal quality processor 150, step 710 is reentered and the loop from step 710 to step 740 is repeated. End of error period signal CO2 also resets error counter 205 and error period counter 215 in FIG. 2. Alternatively, the frame error index may be evaluated for an interval smaller than the error period so that loss of synchronization can be detected earlier.

When signal CO2 is detected by signal quality processor 150 (step 740), signal BER representing the bit error rate for the error period is generated in the signal quality processor (step 755). Signal BER is compared to a fixed threshold THBER in step 760. Where threshold THBER is not exceeded, step 701 is reentered for the next error period. In the event threshold THBER is exceeded, a channel report signal CRS is outputted together with the BER signal from signal quality processor 150 (step 765) so that appropriate action such as changing channels or handoff to another cell may be implemented as is well known in the art. In accordance with the invention, the synchronizing symbol sequence inherent in the frames of the transmitted digital signal are used to measure the quality of the digital signal. Advantageously, signal quality is continuously monitored and it is not necessary to interrupt the transmission of information with special quality messages.

The invention has been described with reference to an illustrative embodiment thereof. It is apparent, however, that various modifications and changes may be made by one skilled in the art without departing from the spirit and scope of the invention. For example, the sequence of synchronizing symbols generated from the digital signal may be autocorrelated to form a statistical signal representative thereof which statistical signal may be compared to a previously stored statistical threshold to generate a signal representing the quality of the digital signal. Alternatively, the sequence of synchronizing symbols generated from the digital signal may be correlated with the stored synchronizing symbol sequence and a statistical parameter of the correlation may be used as a quality representative signal.

We claim:

1. A terminal for a mobile radio communication system comprising:

means for receiving a digital signal, means responsive to the received digital signal for generating a sequence of symbols partitioned into time frames, each time frame including a prescribed set of synchronization symbols, means for storing a signal corresponding to the prescribed set of synchronization symbols including a first shift register for storing a sequence of symbols representing the prescribed set of synchronization signals in each time frame, means responsive to the prescribed set of synchronization symbols for a plurality of time frames from the symbol generating means and the stored synchronization corresponding signal for generating a signal representative of the differences between the synchronization symbol set generated from the digital signal and the stored synchronization corresponding signal, the means for generating a signal representative of the differences between the synchronization symbol set generated from the digital signal and the stored synchronization corresponding signal comprises means for comparing each prescribed synchronization symbol set generated from the digital signal and the stored synchronization corresponding signal to generate a difference signal, the comparing means comprising:

a second shift register responsive to the synchronization signals generated from the digital signal for sequentially storing the synchronization symbols generated from the digital signal, a third shift register, means for generating a signal identifying the symbol periods in each time frame corresponding to the prescribed set of synchronization symbols, means connected between the second and third shift registers responsive to the symbol period identifying signal for transferring the synchronization symbols in the second shift register to the third shift register, means responsive to the identified symbol period signal for detecting mismatches between each symbol position in the first shift register and the corresponding symbol position in the third shift register, and means responsive to each detected mismatch for generating an error signal, and means responsive to the differences representative signal for forming a signal representing the quality of the received digital signal.

2. A terminal for a mobile radio communication system according to claim 1 further comprising
means responsive to the occurrences of a predetermined number of symbol period identifying signals for setting a prescribed signal evaluation period,
means for producing a signal quality threshold,
means responsive to the error signals from the mismatch detecting means for generating a symbol error rate signal during each signal evaluation period, and
means responsive to the symbol error rate signal and the signal quality threshold for forming a signal representing the quality of the digital signal in the prescribed signal evaluation period.

3. In a terminal for a mobile radio communication system, a method for determining the quality of a received digital signal comprising the steps of:
receiving a digital signal,
generating a sequence of symbols partitioned into time frames responsive to the received digital signal, each time frame including a prescribed set of synchronization symbols,
storing a signal corresponding to the prescribed set of synchronization symbols by storing the sequence of symbols representing the prescribed set of synchronization signals in each time frame in a first shift register, and
generating a signal representative of the differences between the synchronization symbol set generated from the digital signal and the stored synchronization corresponding signal responsive to the prescribed set of synchronization symbols for a plurality of time frames from the symbol generating means and the stored synchronization corresponding signal, and the step of generating a signal representative of the differences between the synchronization symbol set generated from the digital signal and the stored synchronization corresponding signal comprises comparing each prescribed synchronization symbol set generated from the digital signal with the stored synchronization corresponding signal to generate a difference signal, and
the comparing step comprises:
sequentially storing the synchronization symbols generated from the digital signal in a second shift register responsive to the synchronization signals generated from the digital signal,
generating a signal identifying the symbol periods in each time frame corresponding to the prescribed set of synchronization symbols responsive to the digital signal,
transferring the synchronization symbols in the second shift register to a third shift register responsive to the symbol period identifying signal,
detecting mismatches between each symbol position in the first shift register and the corresponding symbol position in the third shift register in the identified symbol period, and
generating an error signal responsive to each detected mismatch, and
forming a signal representing the quality of the received digital signal responsive to the differences representative signal.

4. In a terminal for a mobile radio communication system, a method for determining the quality of a received digital signal according to claim 3 further comprising the steps of
setting a prescribed signal evaluation period responsive to the occurrences of a predetermined number of identified symbol periods,
producing a signal quality threshold,
generating a symbol error rate signal responsive to the error signals produced in the mismatch detecting step in the prescribed signal evaluation period, and
forming a signal representing the quality of the digital signal for the prescribed signal evaluation period responsive to the symbol error rate signal and the signal quality threshold.

* * * * *